(12) United States Patent
Goker et al.

(10) Patent No.: US 11,676,635 B1
(45) Date of Patent: Jun. 13, 2023

(54) LARGE FORM FACTOR EXTENDED TAPE PATH MAGNETIC TAPE STORAGE DEVICE

(71) Applicant: Quantum Corporation, San Jose, CA (US)

(72) Inventors: Turguy Goker, Oceanside, CA (US); Clark Janssen, Fargo, ND (US); Joe K. Jurneke, Brighton, CO (US); Lawrence G. Neumann, Leominster, MA (US); Scott M Rockwell, Aurora, CO (US)

(73) Assignee: QUANTUM CORPORATION, San Jose, CA (US)

( * ) Notice: Subject to any disclaimer, the term of this patent is extended or adjusted under 35 U.S.C. 154(b) by 0 days.

(21) Appl. No.: 17/356,480

(22) Filed: Jun. 23, 2021

(51) Int. Cl.
*G11B 15/68* (2006.01)
*G11B 23/023* (2006.01)

(52) U.S. Cl.
CPC ...... *G11B 15/6835* (2013.01); *G11B 23/0236* (2013.01)

(58) Field of Classification Search
None
See application file for complete search history.

(56) References Cited

U.S. PATENT DOCUMENTS

| | | | | |
|---|---|---|---|---|
| 4,910,619 A * | 3/1990 | Suzuki et al. | ..... | G11B 15/6835 360/92.1 |
| 6,588,694 B1 * | 7/2003 | Wilkerson | ......... | G11B 15/6835 242/348.2 |
| 9,984,720 B1 * | 5/2018 | Harper et al. | ......... | G11B 15/60 |
| 2003/0155460 A1 * | 8/2003 | Hiraguchi | .......... | G11B 15/6835 242/337 |
| 2005/0197736 A1 * | 9/2005 | Hanagata | ........... | G11B 15/6835 700/214 |
| 2009/0129215 A1 * | 5/2009 | Noguchi et al. | ... | G11B 15/6815 369/36.01 |
| 2021/0148590 A1 * | 5/2021 | Aschenberg et al. | .. | G05D 27/02 |

OTHER PUBLICATIONS

Quantum., "Quantum LTO Tape Drive: Now with DATASTOR Shield Deduplication Software", Quantum Corporation, Jun. 2020, 2 pages.

* cited by examiner

*Primary Examiner* — Craig A. Renner
(74) *Attorney, Agent, or Firm* — Roeder & Broder LLP; James P. Broder

(57) ABSTRACT

A tape library having a robot zone and a robot on the robot zone, movable in the robot zone of the tape rack in at least a first direction and a second direction. A tape drive, which has an opening to receive cartridges, is positioned so that the robot nears the tape drive when the robot moves in a second direction. A width of the tape drive is wider than a width of the robot zone. This tape drive design is called the "Sideways Format Path for 19" Rack Libraries." It is achieved by using unique dimensions for a new tape drive that uses blind spaces existing in tape libraries unreachable by the robot to provide a bigger space to design longer tape paths, resulting in higher cartridge density with longer tape path without requiring bigger overall library dimensions for a library of tape cartridges.

20 Claims, 15 Drawing Sheets

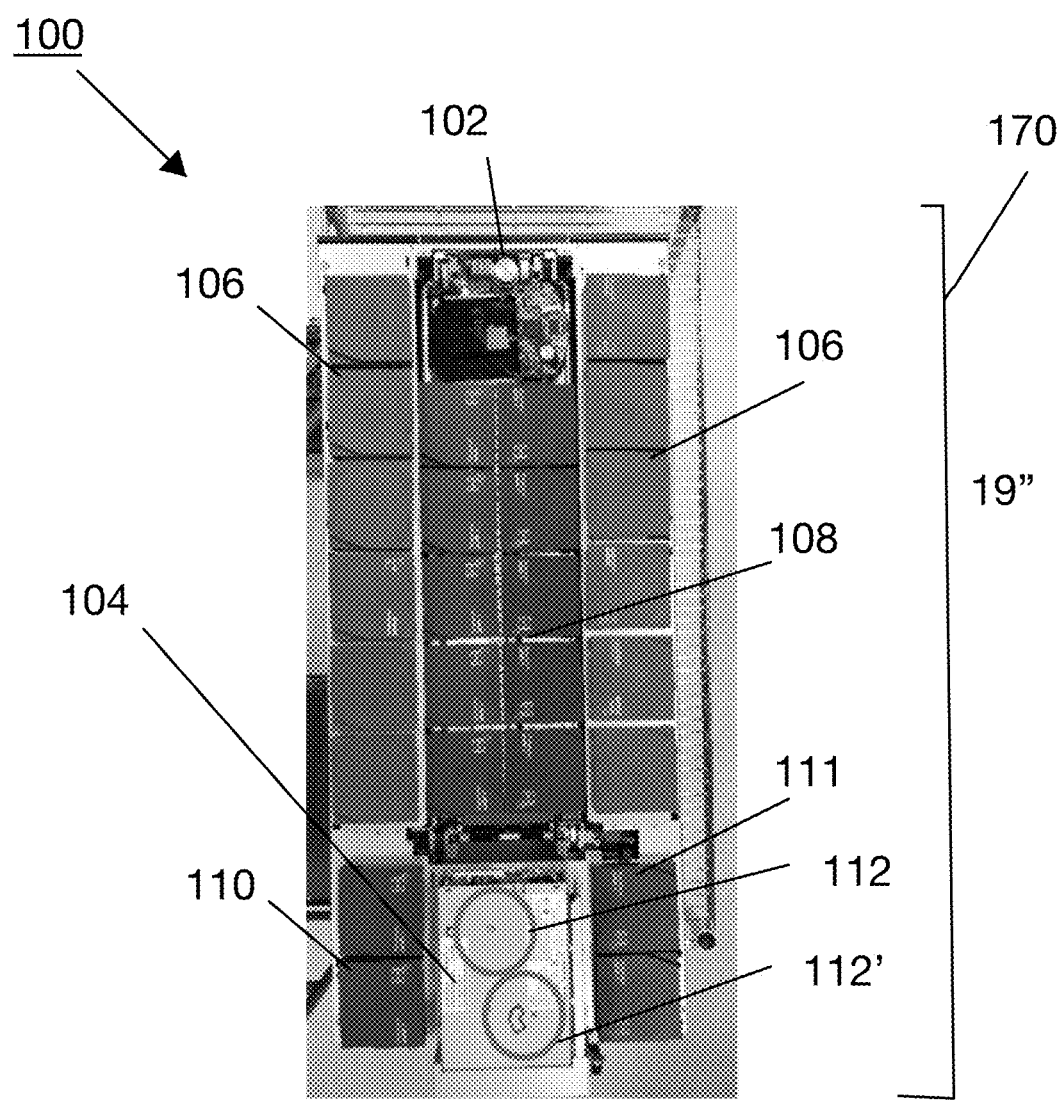
Figure 1(a)
Conventional

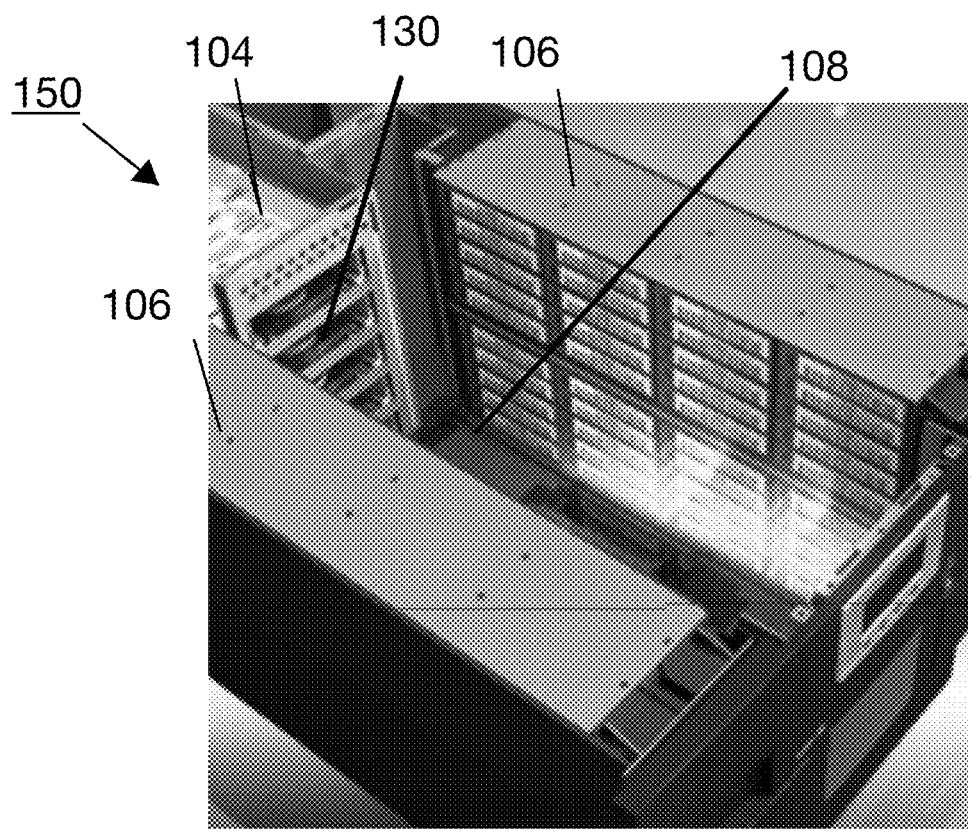
Figure 1(b)
Conventional
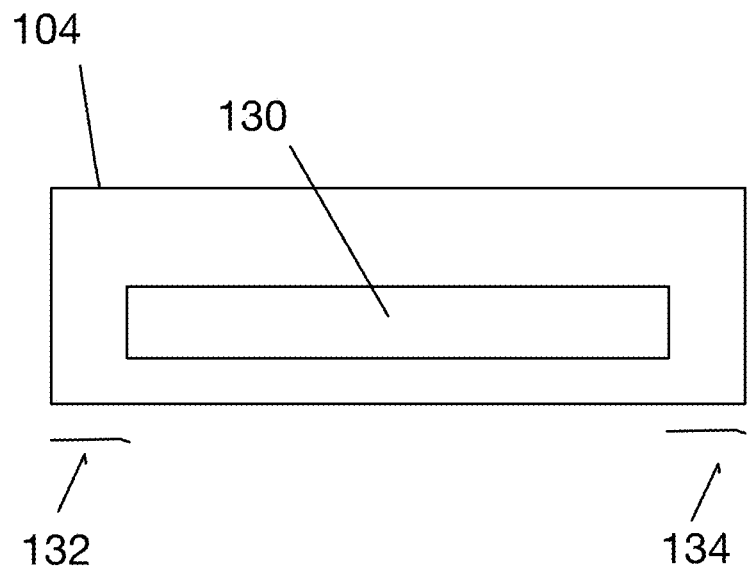
Figure 1(c)
Conventional

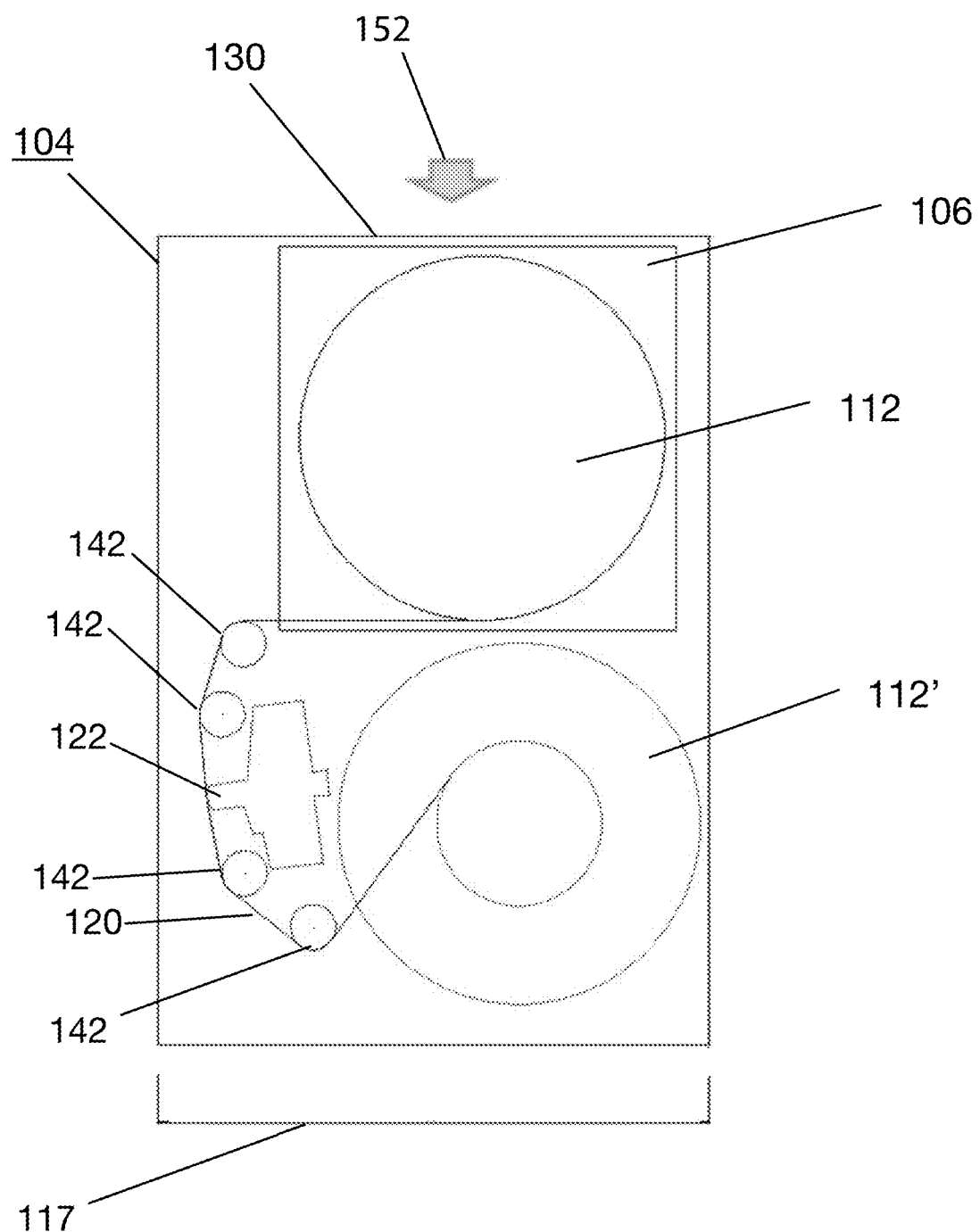
Figure 1(d)
Conventional

US 11,676,635 B1

LARGE FORM FACTOR EXTENDED TAPE PATH MAGNETIC TAPE STORAGE DEVICE

FIELD

The described embodiments relate to a large form factor magnetic tape storage device and, specifically, to a magnetic tape storage device having an increased areal density.

BACKGROUND

Conventional magnetic tape drive data storage devices are typically constrained by the outside dimensions of the 5.25 inch form factor. The outside dimensions are 5.75 inches wide, 8.06 inches long and either 1.63 or 3.25 inches high. The tape path establishes where the magnetic storage tape travels during operation, to and from storage reels.

FIG. 1(a) shows a top view of a conventional 19" frame LTO (Linear Tape Open) tape library 100. The dimension 170 indicates the total dimension of 19 inches. Tape library 100 comprises a robot 102, a tape drive 104, and two columns of cartridges 106. Tape library 100 further comprises a robot zone 108, where robot 102 moves to load and unload cartridges 106 to and from tape drive 104. Robot zone 108 is shown in the Figure as filled by cartridges although the cartridges are for purposes of clarity (to show size) and normally do not exist in robot zone 108. As illustrated in FIG. 1(a), the exterior width of tape drive 104 is narrower than a width of robot zone 108. Tape library 100 further comprises open space 110 to the left of tape drive 104 and open space 111 to the right of tape drive 104, both of which again are shown with cartridges for purposes of clarity (to show size), although these cartridges do not normally exist in open spaces 110 and 111. Open spaces 110 and 111 are not visible to robot 102 and tape drive 104. Open spaces 110 and/or 111 may be occupied by power supply, electronics, cables, etc. FIG. 1(a) shows the placement of a cartridge reel 112 and a drive reel 112' within tape drive 104. A cartridge having cartridge reel 112 is placed in tape drive 104 by robot 102.

FIG. 1(b) shows a three-quarters view of a conventional tape library 150 showing that the conventional tape library is configured with multiple vertical stacks of tape drives 104 and multiple vertical stacks of cartridges 106 having a robot zone 108 between the stacked columns of cartridges 106. Conventional tape drives can be either vertically stacked as shown in FIG. 1(b) or non-stacked. In FIG. 1(b), tape drive 104 is narrower than a width of robot zone 108 and a cartridge 106 such as an LTO cartridge is inserted into an opening 130 of one of the drives 104 by robot 102. Other cartridges 106 may be inserted into other openings 130 in other drives 104 by one or more robots 102.

FIG. 1(c) shows a front view of a single, conventional tape drive 104 having an opening 130 to receive a cartridge placed by robot 102. In this conventional tape drive 104, opening 130 is placed so that it is evenly spaced on a body of tape drive 104 in a horizontal direction. Dimensions 132 and 134 on either side of opening 130 are equally sized because opening 130 is centered in tape drive 104 in a horizontal direction. It will be understood that multiple tape drives 104 and cartridges 106 can be vertically stacked as shown in FIG. 1(b). FIG. 1(c) is intended to show the general placement of opening 130 on the body of tape drive 104. Various conventional tape drives 104 may have different dimensions than those shown in FIG. 1(c).

FIG. 1(d) shows an example tape path in a conventional tape drive. The tape path comprises a cartridge reel 112 in a cartridge 106, a drive reel 112', four rollers 142, and a read/write head 122. Cartridge 106 is placed into tape drive 104 through opening 130 in a direction indicated by arrow 152 and its tape 120 is threaded through rollers 142 onto drive reel 112' in a manner known to persons of ordinary skill in the art. In this example, tape drive 104 has a horizontal width 117, which is less than a width of robot zone 108. Horizontal width 117 is measured in a direction perpendicular to the direction indicated by arrow 152 indicating a direction of insertion of cartridge 106.

BRIEF DESCRIPTION OF THE FIGURES

Embodiments of the present invention are illustrated by way of example, and not by way of limitation in the figures of the accompanying drawings and in which like reference numerals refer to similar elements and in which:

FIG. 1(a) shows a top view of a prior art conventional frame LTO (Linear Tape-Open) tape library.

FIG. 1(b) shows a three-quarter view of a prior art conventional tape library similar to that of FIG. 1(a) having multiple levels of tape drives and multiple levels of cartridges in vertical stacks.

FIG. 1(c) shows a front view of a single conventional prior art tape drive having an opening therein to receive a cartridge.

FIG. 1(d) shows an example tape path in a conventional prior art tape drive.

DETAILED DESCRIPTION

Figure 2A:
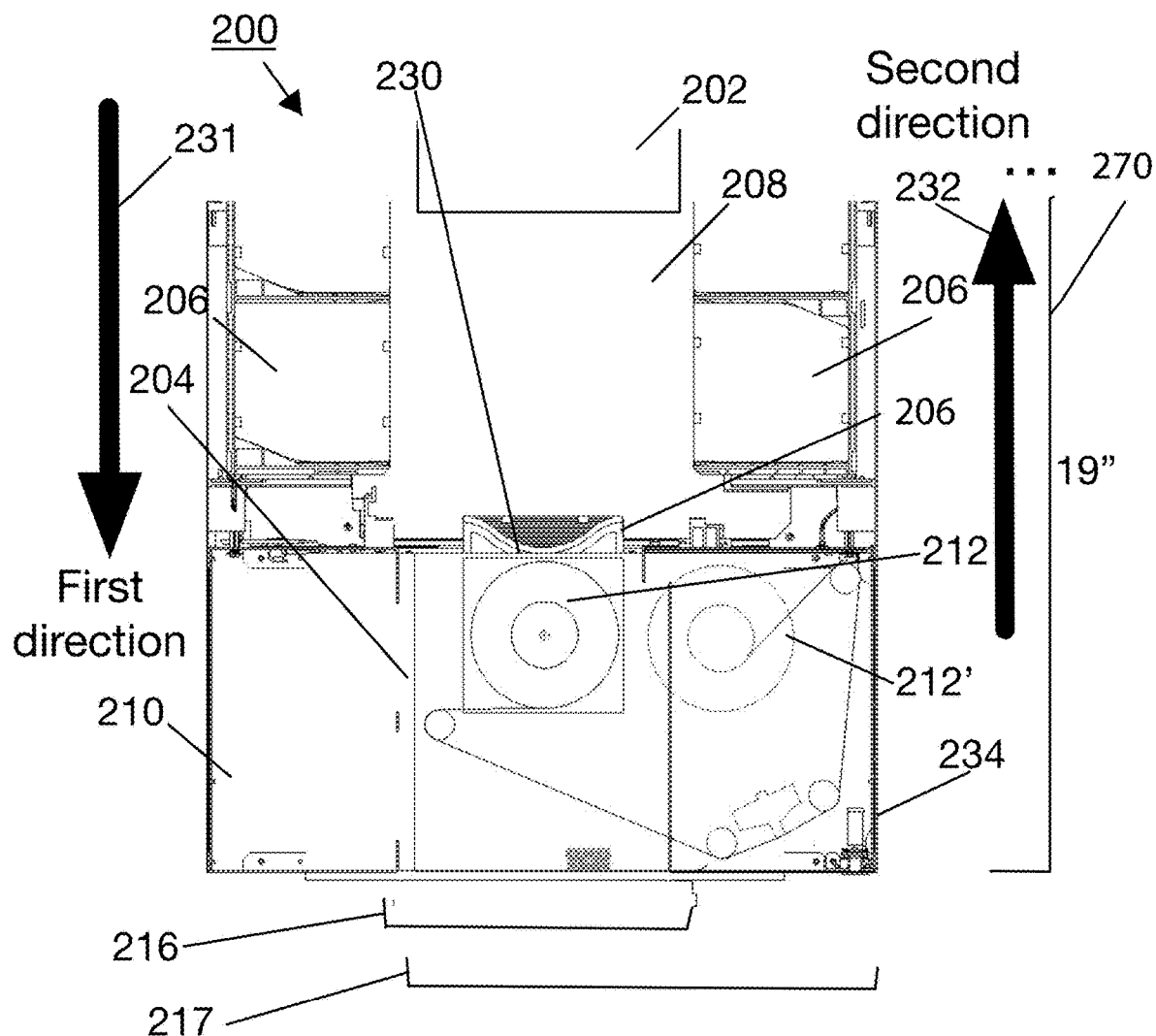
FIG. 2(a) shows an embodiment of a tape library in accordance with an embodiment.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art will understand that other embodiments may be used and that logical, mechanical, electrical, functional and other changes may be made without departing from the scope of the described embodiments. The following detailed description is, therefore, not to be taken in a limiting sense.

A. Overview

In conventional data centers, the tape storage systems are typically based on a standard 19" rack physical configuration and a typical cartridge to drive ratio of less than 150:1. An example of a tape drive used in a conventional 19" rack configuration is described in "Quantum LTO Tape Drives Datasheet", published June 2020, which is herein incorporated by reference. Current 19" rack-based tape libraries typically include 6 drives per 900 cartridges for a standard 19" rack with a vertical dimension typically up to 48 U, where U is a standard rack unit. In a conventional system, drives are a standard 5¼" full height or 2¾" half height size, with length and width dimensions the same. These dimensions limit the length of achievable tape path. Achievable tape path is a key input variable to increase areal densities by increasing track densities. Areal density is a number of bits per square area of storage surface and is determined by bit density multiplied by track density.) Bit density is the number of bits per inch. Track density is the number of tracks per inch. The areal density is a main variable to increase cartridge capacities so increasing areal density increases cartridge capacities. One way of increasing the tape capacity is to make the tape path longer. In a conventional system, increasing the tape path, requires a bigger space for each drive, resulting in fewer cartridges fitting in a 19" rack with a vertical dimension up to 48 U's. Because data centers define their capacity density by how much data one can store in a standard 19" rack footprint, an increase in tape length results in a bigger drive based on conventional drive form factor technology. Thus, using a bigger drive and a higher capacity cartridge in a conventional system negatively affects the final data storage density in a given conventional 19" rack footprint since bigger drives may result in a lower overall cartridge count. In contrast, the described embodiments increase the tape path length and thus increase the areal density, while still maintaining compatibility with conventional LTO cartridges and while still maintaining a conventional number of cartridges in the drive and an opening size in the tape drive so that cartridges will still have conventional overall dimensions.

Another variable that will impact one's ability to increase tape path length is that, in the future, it is likely that the ratio of cartridges to drives will be reduced in order to increase overall transfer rates by reading and or writing with multiple tape drives This future change will result being able to fit more drives in a given 19" rack, which also limits the tape path lengths achievable. In the described embodiments, a longer tape path is enabled with bigger drives while cartridge densities in a given 19" rack are not compromised while still being able increase drive count. The described embodiments also result in a compatible robot and cartridge load unload requirement with conventional LTO cartridge dimensions and specifications.

Track density is a key means to increase areal densities so one must have less lateral tape motion disturbance. One way to reduce lateral tape motion is to have a longer tape path.

Conventionally, tapes and drives are placed in a standard 19" rack system for data centers. Increase of "volumetric density," which is measured in petabytes per cubic feet (PB/ft$^3$), can be achieved by increasing the number of cartridges in a rack and/or by increasing the capacity of a cartridge (or by both). Increasing the number of cartridges within a 19" rack-based system has limitations because there must be space for a robot to move cartridges around, electronics, tapes drives, cabinets, etc. Increasing cartridge capacity requires higher areal densities.

Higher areal densities demand smaller bits and smaller track pitches with a longer tape path and smoother lateral tape motions. Higher track density is a key parameter to achieve higher areal densities. For example, a conventional 18 TB hard disk drive may require a bit length of 10-14 nm and a track pitch of 50-70 nm range. However, a comparable 18 TB Linear Tape Open (LTO) 9 tape uses a bit length of 46 nm with a track pitch of 1190 nm. As another example, LTO-8 tapes have a capacity of 12 TB. The described tapes herein, are longer than the tape length of an LTO-8 tape. Tracking margins require less lateral tape motion disturbances, which is a direct function of the tape path length. The longer the tape path, the smoother the tape motions are and less the disturbance frequencies. Therefore, the drive tracking servo system can write and read with narrower track pitch dimensions. Bigger rollers are desirable since smaller rollers will rotate faster and have higher disturbance frequencies. Any rollers limit how well one can track, so a combination of bigger rollers and a longer tape path enables higher track densities or smaller track pitches.

The above-mentioned size constraints places limitations on the tape path. One limitation the form factor places on the tape path is total length. Another limitation is the side of tape that contacts the tape path guiding features. A conventional LTO 5.25 inch form factor tape drive storage device's tape path length is 230 cm and contains four guiding elements, as shown in FIG. 1(c). Each of the four guiding elements contacts the magnetic side of the storage tape as opposed to the backside where no recording is done. The tape path guides the tape to a lateral position advantageous to the read write head, by applying corrective forces. The corrective forces are related to several factors one of which is tape path length. The corrective forces may be reduced by as much as the cube of the length in some instances. A reduced corrective force translates into less wear on both the guiding surfaces and on the tape edges. In one embodiment, the tape length is greater than current/conventional LTO-8 drive tape path lengths, thus reducing corrective forces.

Tape drives are typically used in environments subject to vibrations. Electronic cooling fans, robotics, and the tape drive's own motors and bearings are all sources of vibration. The spans in the tape path are subject to resonance. The resonance of each span is made up of either compressive or transverse waves. For compressive waves, the resonant frequency is inversely proportional to length. For transverse waves, the resonant frequency is inversely proportional to the square of the length. In both cases increasing the tape path length reduces the resonant frequency. Preferably the read write recording head would be the only item in the tape path to contact the magnetic surface. The read write head is required to make contact for recording and is sensitive to spacing loss. When other elements like tape path guides make contact with the recording surface wear can result. The wear is especially acute during tape start stop motions.

Increasing cartridge density, defined as number of cartridges one can physically put in a typical 19" rack with a vertical dimension up to 48 U, is another way to increase capacity. The unit of cartridge density is number of cartridges per unit area where unit area is the footprint of the 19" rack dimensions, width and length. In the case of a standard LTO cartridge with its dimensions and as shown in FIG. 1(a), the number of cartridges 106 per 19" rack footprint is 12 cartridges. In a typical conventional system with tape drives occupying a standard 5¼" size, the location and position of the drives will be the center of the back or front side of the 19" rack. One way to extend the tape path length would be to extend the tape drive so that it either sticks out from the back side, if it is on the back wall, or sticks out forward, occupying space in the robot zone 108. Having the drive stick into the robot zone would require that some of the two columns of cartridge 106 next to the drive be unused, therefore lowering cartridge density for example from 12 as shown in FIG. 1(a) down to 10 which either case is unacceptable for data center requirements. The described embodiments, instead establish a new tape drive mechanical format that utilizes the space on either side of the tape drive, so that the tape drive has a longer tape path while still being compatible with conventional LTO cartridge dimensions and load configurations. Also, this design maintains the compatibility of cartridge load and unload and drive threading and unthreading mechanism designs. In some embodiments of the designs, shown for example in FIGS. 2(b), 3(b), 4(b), 5(b), and 6(b) the cartridge position in the tape drive is in an inserted position and its pin locations (not shown) are the same as conventional designs as shown in FIG. 1(d). Thus, the embodiments in those figures will work with conventional cartridges, even though the tape paths are different. This feature also results in compatible threading mechanism design for the tape drives, as these embodiments do not require redesigns of conventional cartridge mechanisms.

This new format can be referred to as the "Sideways Format Path for 19" Rack Libraries." It is achieved by using unique dimensions for a new tape drive that places the internal drive reel in blind spaces in existing in tape libraries, unreachable by the robot, to provide a bigger space to enable longer tape paths, resulting in higher cartridge density with longer tape path without requiring bigger overall library dimensions, or redesign of drives. The internal drive reel is offset from the cartridge reel, in one embodiment.

Tape libraries having cartridges with a higher-than-conventional areal density are usable with the described embodiments. If cartridges have a higher areal density, it is necessary to have an increased tape path in the tape drive. Higher areal density based on higher track density will mean the drive must write, and track follow, to read a narrower track with smaller dimensions. This results in lower and lower margins, which is track pitch minus reader width. Note that the read must be less than track pitch for linear recordings so as the track pitch gets narrower, the reader is reduced and margins are smaller. This means that tape cannot move laterally too fast, to ensure that the drive's tracking servo can follow and trim tracks with accuracy without being off track.

B. Embodiments

FIG. 2(a) shows an embodiment of a tape library 200. For simplicity only a portion of the tape library 200 is illustrated. In one embodiment, the dimension 270 indicates the total dimension of 19 inches, although only a portion of the dimension is shown. Tape library 200 comprises a robot 202 (shown partially), a tape drive 204, and two columns of cartridges 206. Tape library 200 further comprises a robot zone 208 between the two columns of cartridges 206. Robot 202 moves in the robot zone 208 to move a one of cartridges 206 to and from tape drive 204. The robot 202 is movable in the robot zone 208 of the tape library 200 in at least a first direction 231 and a second direction 232.

Tape library 200 further comprises an open space 210 to the left of tape drive 204. Open space 210 is not useable (not visible or blind) to robot 202 and drive 204. Open space 210 may also be occupied by power supply, electronics, cables, etc. In one embodiment, the tape drive 204 extends to the right wall 234 of a housing of tape library 200. Tape drive 204 has a width 217 that is wider than a width 216 of robot zone 208. FIG. 2(a) shows the placement of two tape reels: cartridge reel 212 and drive reel 212' within tape drive 204 as described further in connection with FIG. 2(b). For purposes of comparison, in this embodiment, tape reels 212, 212' are the same size as conventional reels 112, 112' in FIG. 1(d). Because tape drive 204 is larger than a conventional tape drive, the two reels can be spaced farther apart, allowing for a longer tape path while maintaining a same cartridge 206 size and drive opening 230 configuration and horizontal mount scheme. Tape library 200 is ideal for, for example, type 19" rack-based modular tape libraries for based RAIL applications, where RAIL stands for Redundant Array of Independent Libraries, such that copies and or erasure coded tapes are spread across multiple libraries of the RAIL configuration providing reliability and availability for library failures, such as the Scalar i6H tape library by QUANTUM®.

Conventional robot 102 shown in FIG. 1(a) occupies robot zone 108, and as shown the size of robot 102 is nearly 2 LTO cartridges wide. However, in one embodiment robot 202 in FIG. 2(a) occupies a smaller size, not less than a single LTO cartridge width, resulting in narrower 19" rack libraries, therefore potentially increasing the overall cartridge density of a data center room having many libraries in a RAIL type configuration. This results in narrower libraries and thus higher cartridge efficiency numbers for the data center rooms. One embodiment of the "Sideway Tape Path for 19" Rack Libraries" is compatible with narrow rack-based library designs.

In this embodiment, the tape library 200 maintains the same outer cartridge and drive opening 230 configuration as a conventional tape library, allowing it to be used for conventional tape cartridges, for example, type 19" rack-based modular tape libraries.

Figure 2B:
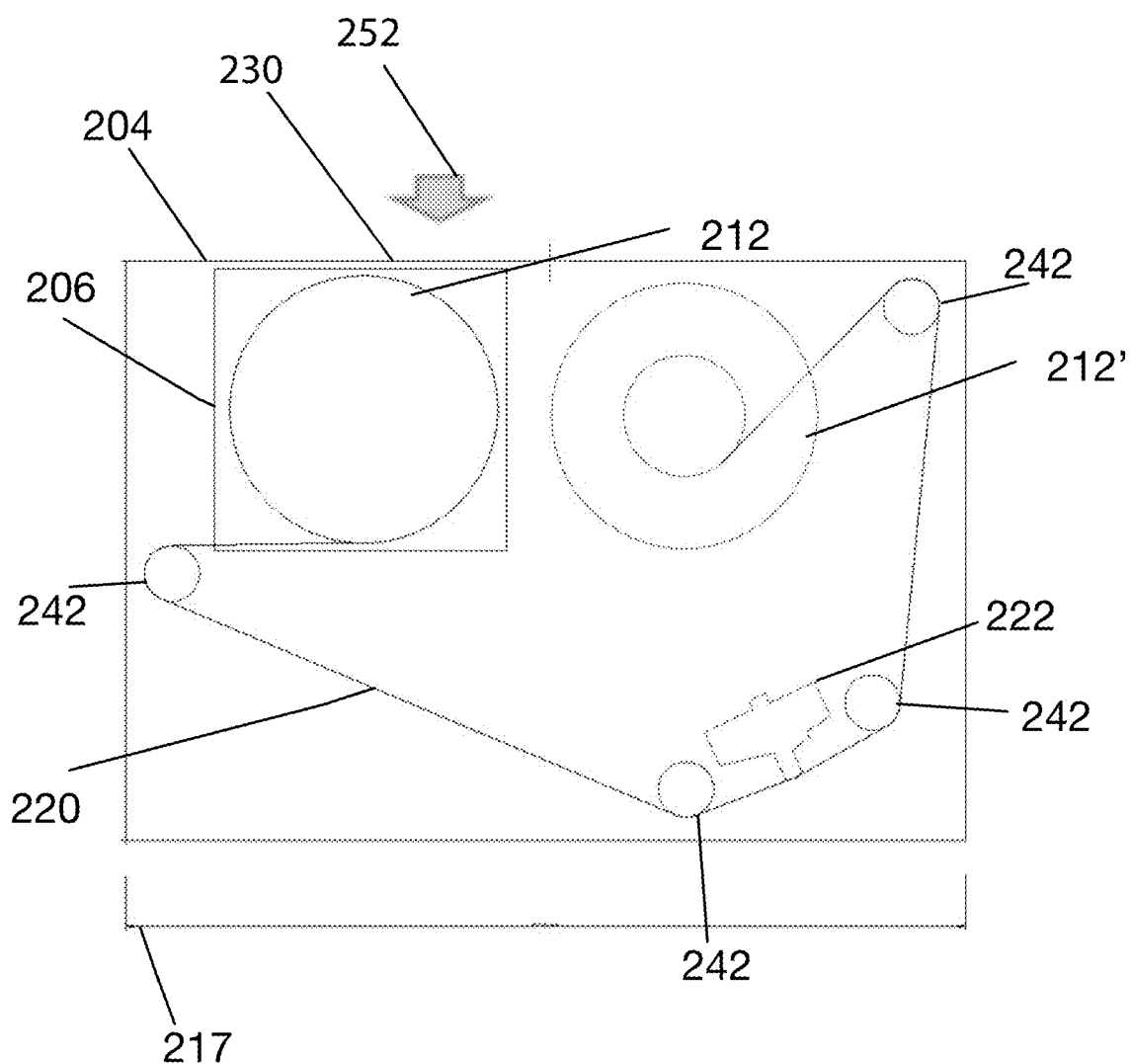
FIG. 2(b) shows an example tape path in the tape drive of FIG. 2(a).

FIG. 2(b) shows an example tape path in tape drive 204 of FIG. 2(a). It should be understood that any tape path can be used that will fit into the expanded size of tape drive 204. FIG. 2(b) illustrates an exemplary tape path that may be used. The tape path comprises a cartridge reel 212 in a cartridge 206, a drive reel 212', a tape 220, four rollers 242, and a read/write head 222. Cartridge 206 is placed into tape drive 204 through opening 230 in a direction indicated by arrow 252 and its tape 220 is threaded through rollers 242 onto drive reel 212' in a manner known to persons of ordinary skill in the art. The width 217 of tape drive 204 is wider than a horizontal dimension 216 of robot zone 208 (see FIG. 2(a)).

In this embodiment, the tape library maintains the same cartridge and drive opening 230 configuration, with reference to robot zone 208, allowing it to be used for conventional tape cartridges. In this embodiment a larger form factor tape drive is permitted based on convenient and available robotic library space. The larger form factor tape drive is, for example, 303 mm wide and 210 mm tall. In one embodiment, the rollers 242 contact a magnetic side of tape 220. The larger form factor allows for a longer tape path.

Figure 2C:
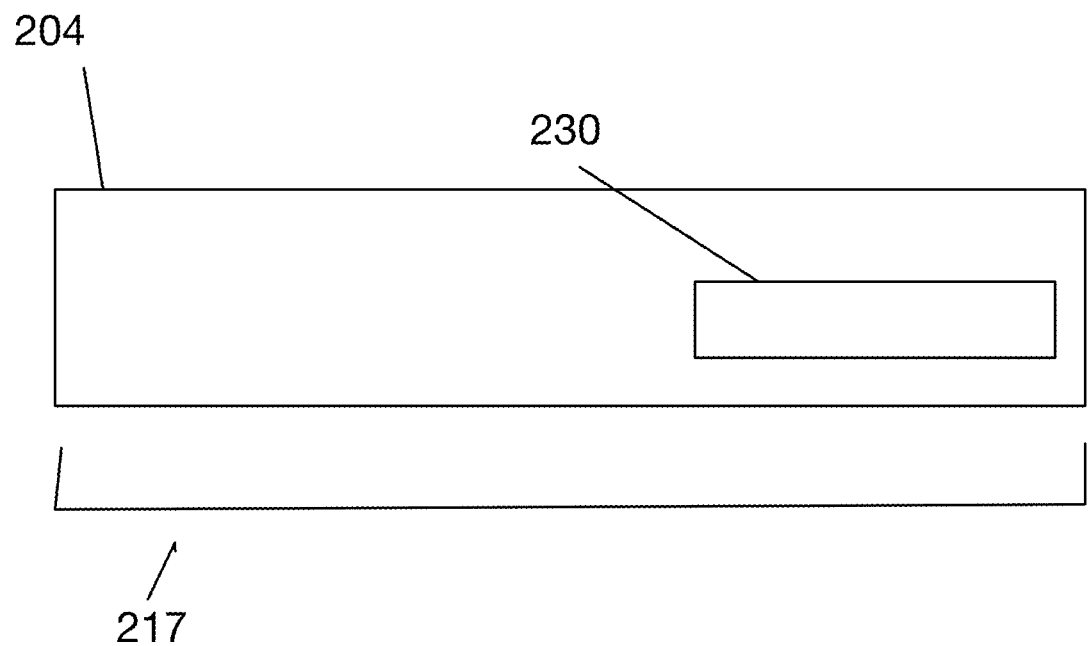
FIG. 2(c) shows a front view of the tape drive of FIG. 2(a) having an opening therein to receive a cartridge.
Figure 3A:
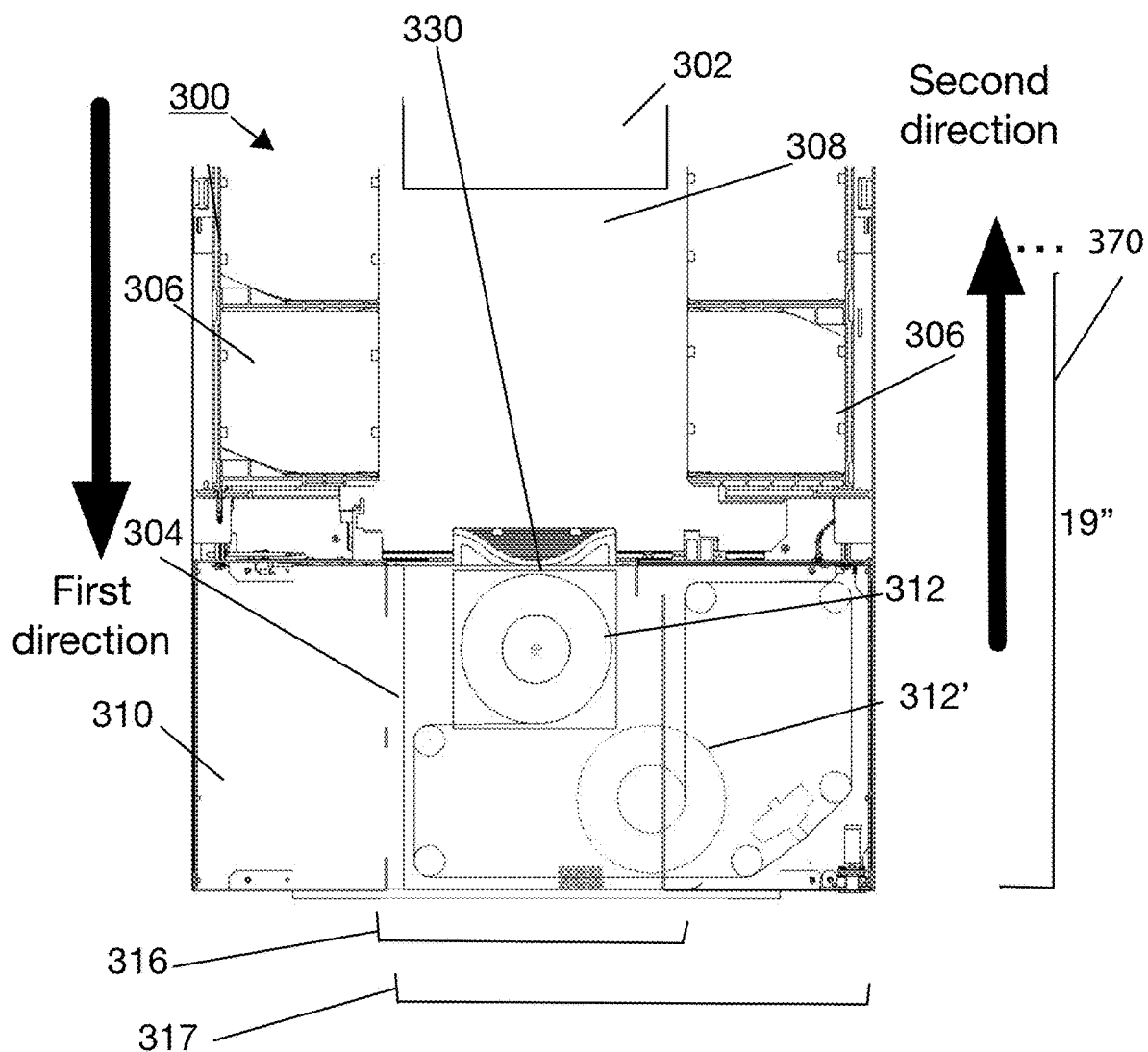
FIG. 3(a) shows an embodiment of a tape library in accordance with an embodiment.
Figure 4A:
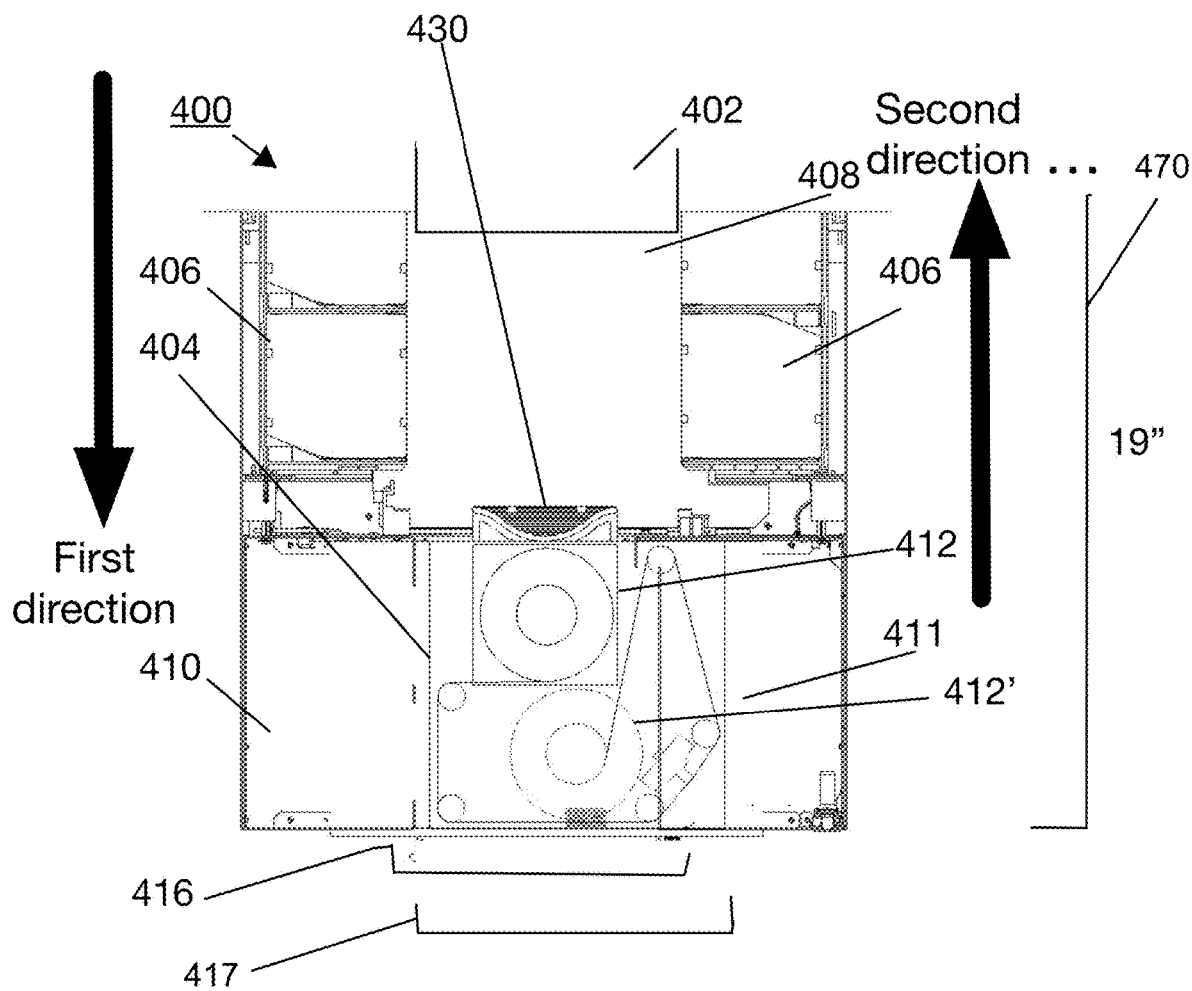
FIG. 4(a) shows an embodiment of a tape library in accordance with an embodiment.

FIG. 2(c) shows a front view of the tape drive 204 of FIG. 2(a) having an opening 230 to receive a cartridge 206. In one embodiment, the front views of the openings 330, 440 of the tape drives in FIGS. 3(a) and 4(a) are similar to the opening 230 of FIG. 2(c) in that the cartridge-receiving opening of each is not centered horizontally. In the embodiment of FIG. 2(a), opening 230 is of a width and height to receive a cartridge from robot 202.

FIG. 3(a) shows another embodiment of a tape library 300. Only a portion of the total dimension of the tape library 300, e.g., dimension 370, is shown. Tape library 300 comprises a robot 302 (shown partially), a tape drive 304, and two columns of cartridges 306. Tape library 300 further comprises a robot zone 308 between the two columns of cartridges 306. Robot 302 moves in robot zone 308 to move cartridges 306 to and from drive 304. Tape library 300 further comprises open space 310 to the left of tape drive 304. Open space 310 is blind to robot 302 and drive 304 where open space 310 may also be occupied by power supply, electronics, cables, etc. FIG. 3(a) shows the placement of two tape reels 312, 312' within tape drive 304 as described further in connection with FIG. 3(b). Because tape drive 304 is larger than the conventional tape drive, the two reels can be spaced farther apart, allowing for a longer tape path while maintaining a same cartridge and drive configuration and horizontal mount scheme. Tape library 300 is ideal for, for example, i6H type RAIL applications.

In this embodiment, the tape library maintains the same cartridge and drive opening 330 configurations with reference to robot zone 308, allowing it to be used for conventional tape cartridges. FIG. 3(a) shows drive 304 on the right side, but drive 304 can occupy the left side or both sides in other embodiments. It will be noted that drive 304 has a width 317 wider than a width 316 of robot zone 308.

Figure 3B:
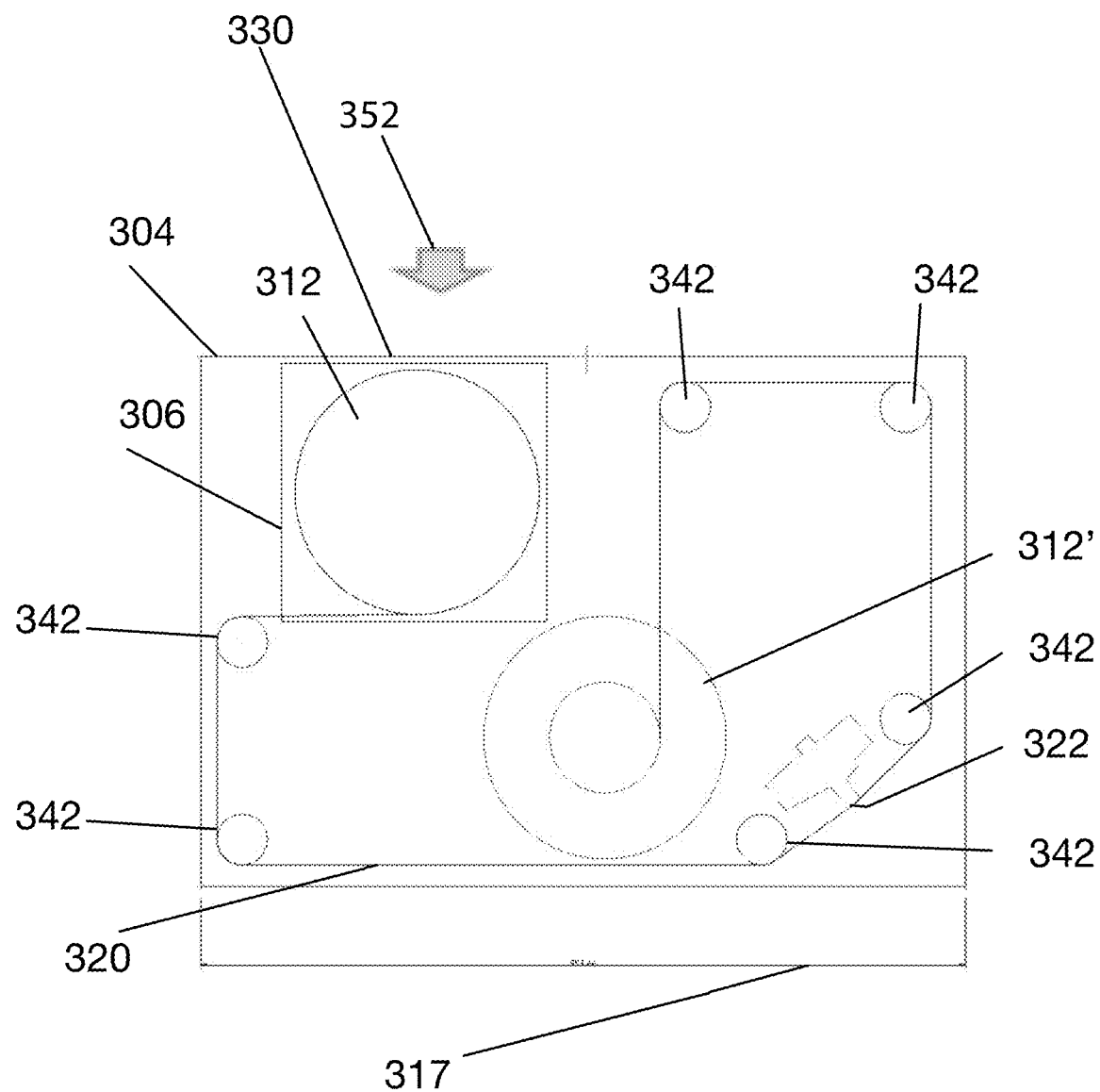
FIG. 3(b) shows an example tape path in the tape drive of FIG. 3(a).

FIG. 3(b) shows an example tape path in the tape drive 304 of FIG. 3(a). It will be understood that any tape path can be used that will fit into the expanded size of tape drive 304 and that this tape path is an example of an appropriate tape path. The tape path comprises a cartridge reel 312 in a cartridge 306, a drive reel 312', six rollers 342, and a read/write head 322. Cartridge 306 is placed into tape drive 304 through opening 330 in a direction indicated by arrow 352 and its tape 320 is threaded through rollers 342 onto drive reel 312' in a manner known to persons of ordinary skill in the art. A horizontal dimension 317 of tape drive 304 is wider than the width 316 of robot zone 308 (see FIG. 3(a)).

In this embodiment a larger form factor tape drive is permitted based on convenient and available robotic library space. The larger form factor is, for example, 303 mm wide and 210 mm tall. The rollers contact the magnetic side of the tape. The larger form factor allows for a longer tape path and limited contact against the recording surface.

FIG. 4(a) shows an embodiment of a tape library 400 in accordance with an embodiment. Reference number 470 indicates a dimension of 19 inches, although only a portion of dimension 470 is shown. Tape library 400 comprises a robot 402 (shown partially), a tape drive 404, and two columns of cartridges 406. Tape library 400 further comprises a robot zone 408 between the two columns of cartridges 406. Robot 402 moves in robot zone 408 to move cartridges 406 to and from drive 404. Tape library 400 further comprises an open space 410 to the left of tape drive 404 and an open space 411 to the right of tape drive 404. Open spaces 410 and 411 are blind to robot 402 and drive 404 and may also be occupied by power supply, electronics, cables, etc. FIG. 4(a) shows the placement of two tape reels 412, 412' within tape drive 404 as described further in connection with FIG. 4(b). Because tape drive 404 is larger than a conventional tape drive, the two reels can be spaced farther apart, allowing for a longer tape path while maintaining a same cartridge and drive configuration. Tape library 400 is ideal for, for example, i6H type RAIL applications.

In this embodiment, the tape library maintains the same cartridge and drive opening 430 configurations with reference to robot zone 408, allowing it to be used for conventional tape cartridges. FIG. 4(a) shows an exemplary configuration in which drive 404 is not centered on robot zone 408, extending to the side past robot zone 408 and extending further to the right than the left. Drive 404 can be positioned on the left side or both sides in other embodiments. It will be noted that drive 404 has a wider horizontal dimension 417 than a width 416 of robot zone 408.

Figure 4B:
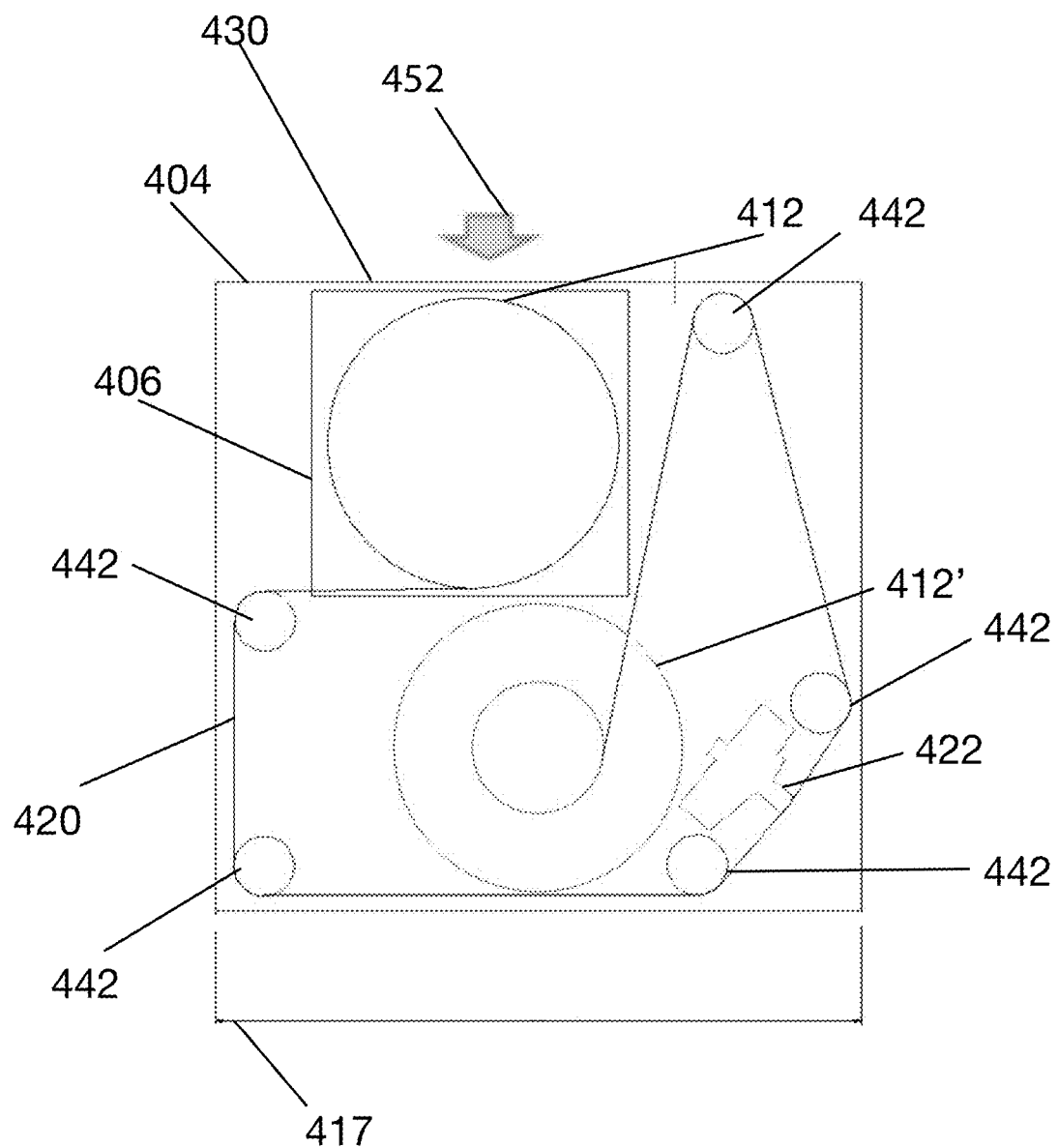
FIG. 4(b) shows an example tape path in the tape drive of FIG. 4(a).

FIG. 4(b) shows an example tape path in the tape drive 404 of FIG. 4(a). It will be understood that any tape path can be used that will fit into the expanded size of tape drive and that this tape path is an example of an appropriate tape path. The tape path comprises a cartridge reel 412 in a cartridge 406, a tape 420, a drive reel 412', five rollers 442, and a read/write head 422. Cartridge 406 is placed into tape drive 404 through opening 430 in a direction indicated by arrow 452 and its tape 420 is threaded through rollers 442 onto drive reel 412' in a manner known to persons of ordinary skill in the art. A horizontal dimension 417 of tape drive 404 is wider than the width 416 of robot zone 408 (see FIG. 4(a)).

In this embodiment a larger form factor tape drive is permitted based on convenient and available robotic library space. The larger form factor is, for example, 215 mm wide and 210 mm tall In one embodiment the height is the same as a conventional tape drive. The rollers contact the magnetic side of the tape. The larger form factor allows for a longer tape path and limited contact against the recording surface.

Conventional tape paths, such as those described in FIG. 1(a), which are used in LTO drives, guide on the magnetic side of the tape, where data is stored. Conventionally, the magnetic head and the rollers to guide the tape make contact and establish tribology conditions with the magnetic recording side where magnetic layer is less than a few hundred nm thick. But this contact with the magnetic side of the tape results in potential debris generation, which is a serious problem for high areal density recordings with readers that are sub 1000 nm wide with shield to shield spacing less than 100 nm. Also, the magnetic side must be very smooth to have near contact recording with a very small head to magnetic spacing. Unlike the magnetic side, the back side of the tape is rougher compared to the magnetic side. This offers the opportunity to design tape paths that reduce the amount of contact with the magnetic side of the tape. In one embodiment, a configuration may be designed where the rollers contact only the back of the magnetic tape, so the magnetic head is the only element that makes contact with the front magnetic side, thus improving tribology and resulting in less debris. In designs with conventional LTO cartridge and pin locations, and conventional tape path configurations, it is not feasible to enable back side tape guiding since such design needs more area.

Figure 5A:
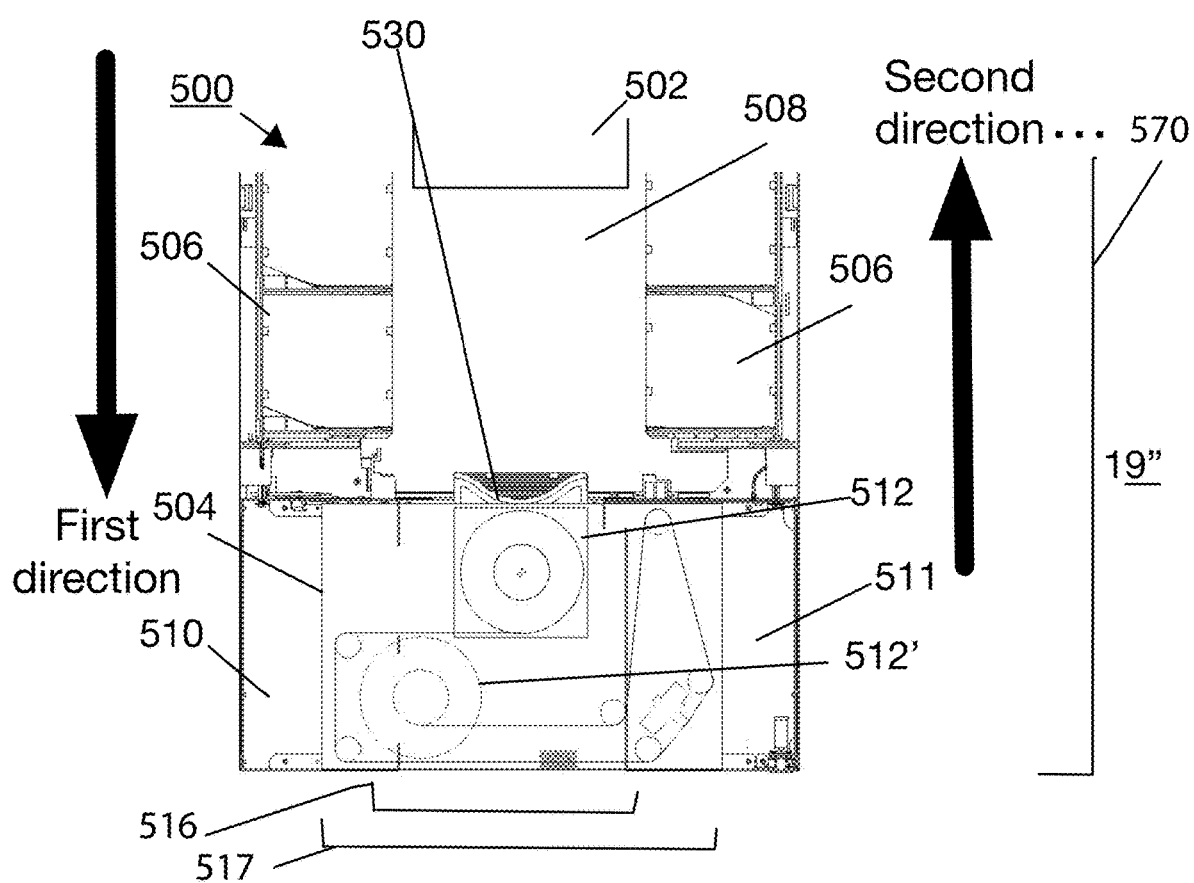
FIG. 5(a) shows an embodiment of a tape library in accordance with an embodiment.
Figure 5B:
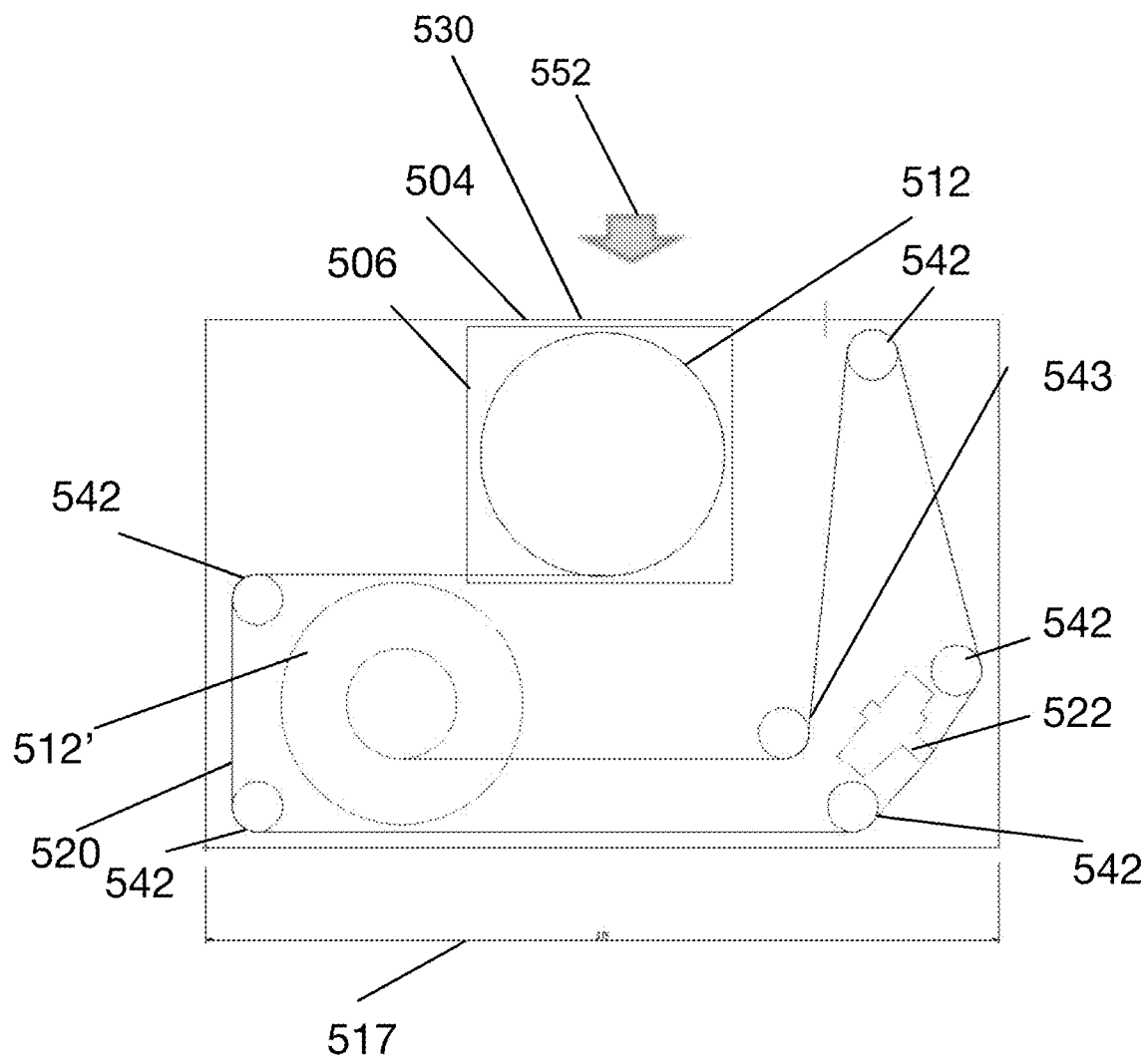
FIG. 5(b) shows an example tape path in the tape drive of FIG. 5(a).
Figure 5C:
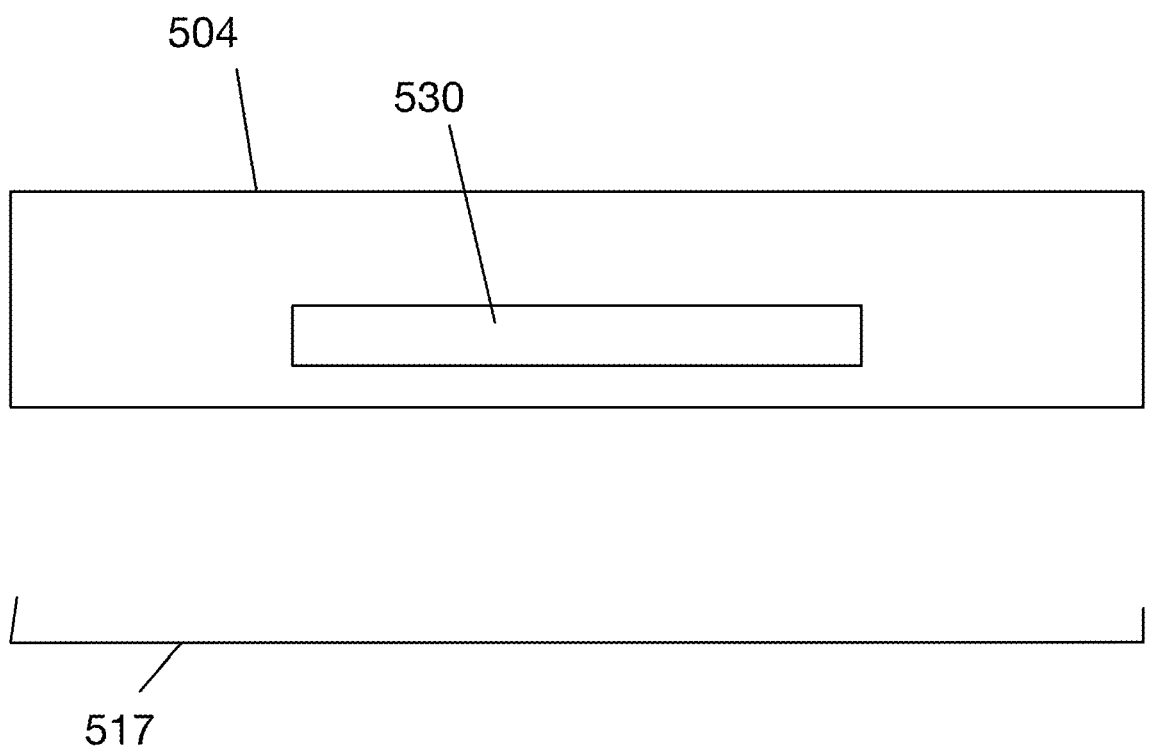
FIG. 5(c) shows a front view of the tape drive of FIG. 5(a) having an opening therein to receive a cartridge.

FIG. 5(a) shows an embodiment of a tape library 500 in accordance with an embodiment. Reference number 570 indicates a dimension of 19 inches, although only a portion of dimension 570 is shown. Tape library 500 comprises a robot 502 (shown partially), a tape drive 504, and two columns of cartridges 506. Tape library 500 further comprises a robot zone 508 between the two columns of cartridges 506 in which robot 502 moves in a first and a second direction. Robot 502 moves in the robot zone 508 to move cartridges 506 to and from drive 504. Tape library 500 further comprises an open space 510 to the left of tape drive 504 and an open space 511 to the right of tape drive 504. Open spaces 510 and 511 are not visible to robot 502 and drive 504 and may also be occupied by power supply, electronics, cables, etc. In FIG. 5(a), tape drive 504 is roughly centered on robot zone 508 and openings 510 and 511 are approximately the same width. In other examples, drive 504 may be off-center to robot zone 508 and openings 510 and 511 may not be the same width. FIG. 5(*a*) shows the placement of two tape reels within tape drive 504 as described further in connection with FIG. 5(*b*). Because tape drive 504 is larger than the conventional tape drive, the two reels can be spaced farther apart, allowing for a longer tape path while maintaining a same cartridge and drive configuration and horizontal mount scheme. Tape library 500 is ideal for, for example, type 19" rack-based modular tape libraries.

In this embodiment, the tape library maintains the same cartridge and drive opening 530 configuration with reference to robot zone 508, allowing it to be used for conventional tape cartridges.

FIG. 5(*b*) shows an example tape path in the tape drive 504 of FIG. 5(*a*). It will be understood that any tape path can be used that will fit into the expanded size of tape drive and that this tape path is an example of an appropriate tape path. The tape path comprises a cartridge reel 512 in a cartridge 506, a tape 520, a drive reel 512', six rollers 542, 543, and a read/write head 522. Cartridge 506 is placed into tape drive 504 through opening 530 in a direction indicated by arrow 552 and its tape 520 is threaded through rollers 542, 543 onto drive reel 512' in a manner known to persons of ordinary skill in the art. A horizontal dimension 517 of tape drive 504 204 is wider than a horizontal dimension 516 of robot zone 508 (see FIG. 5(*a*)). In general, having fewer rollers touching the magnetic side of a tape reduces the wear on the magnetic side of the tape, although as shown in some of the examples, touching the magnetic side may be acceptable in some embodiments.

In this embodiment a larger form factor tape drive is permitted based on convenient and available robotic library space. The larger form factor is, for example, 315 mm wide and 210 mm tall. The rollers 542 contact a magnetic side of the tape. Roller 543 contacts a non-magnetic side of the tape. The larger form factor allows for a longer tape path and limited contact against the magnetic recording surface.

FIG. 5(*c*) shows a front view of the tape drive 504 of FIG. 5(*a*) having opening 530 to receive a cartridge 506. Opening 530 is centered horizontally. In the embodiment of FIG. 5(*c*), opening 530 is of a width and height to receive a cartridge from robot 502.

The embodiments described herein (FIGS. 2(*a*) through 6(*c*)) show a robot zone 208, 308, 408, 508, 608 of a width of approximately a single cartridge. It will be understood that in other embodiments, a robot zone can be approximately twice the size of a single cartridge (similar to the tray width shown in FIG. 1(*a*)). For example, use of a single width robot zone instead of a double width allows a ¼ reduction in the width of a robot/cartridge, tape drive system. For example, if a conventional system of FIG. 1(*a*) can hold N cartridges in an Z ft^2 area, the embodiment of FIG. 2(*a*) can have N cartridges in a (¾)*Z space, therefore increasing the cartridge area density by a factor of greater than 30%, in at least one embodiment.

In embodiments with a double width robot zone, a width of the tape drive is still wider than a width of the (double width) robot zone. In one embodiment, when we use a Side Mounted Tape Path for 19" Rack Libraries the width is wider than a conventional robot.

Figure 6A:
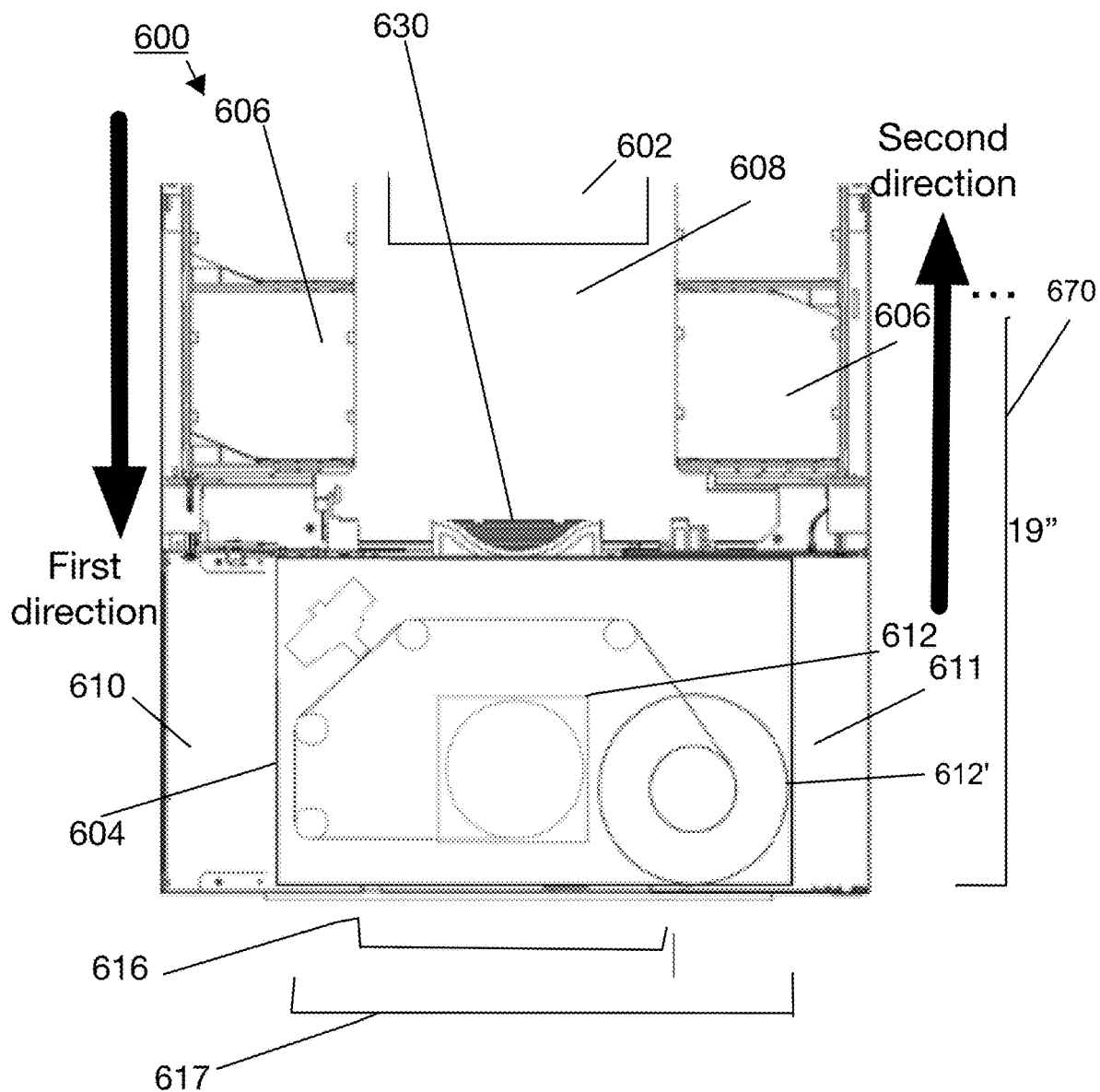
FIG. 6(a) shows an embodiment of a tape library in accordance with an embodiment.
Figure 6B:
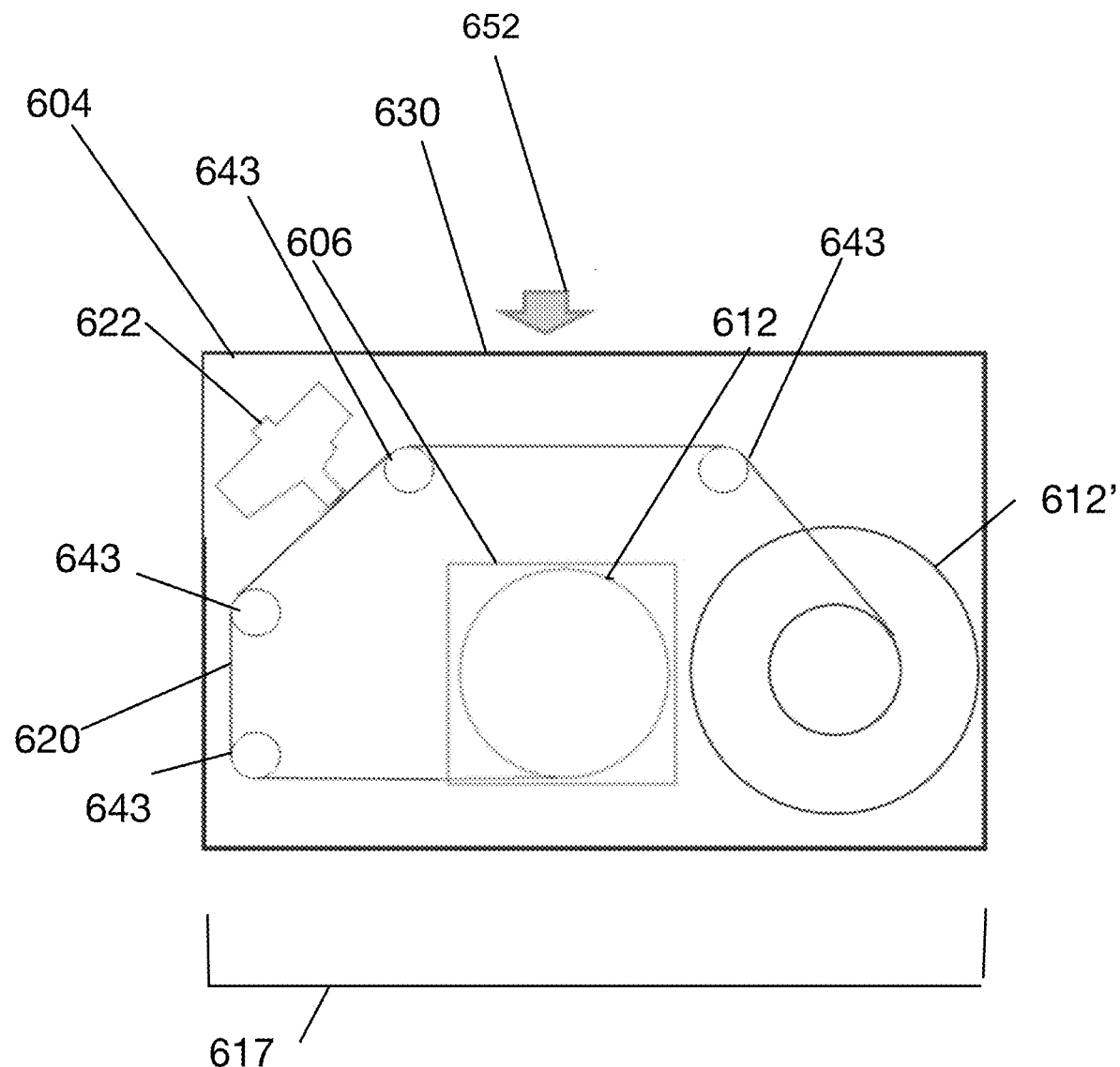
FIG. 6(b) shows an example tape path in the tape drive of FIG. 6(a).

FIG. 6(*a*) shows another embodiment of a tape library in accordance with an embodiment. FIG. 6(*b*) shows an example tape path in the tape drive of FIG. 6(*a*). Reference number 670 indicates a dimension of 19 inches, although only a portion of dimension 670 is shown. Tape library 600 comprises a robot 602 (shown partially), a tape drive 604, and two columns of cartridges 606. Tape library 600 further comprises a robot zone 608 between the two columns of cartridges 606 in which robot 602 moves. Robot 602 moves in the robot zone 608 to move cartridges 606 to and from drive 604. Tape library 600 further comprises an open space 610 to the left of tape drive 604 and an open space 611 to the right of tape drive 604. Open spaces 610 and 611 are not visible to robot 602. Drive 604 and may be occupied by power supply, electronics, cables, etc. In FIG. 6(*a*), tape drive 604 is not centered on robot zone 608 and openings 610 and 611 are not the same width. In other examples, drive 604 may be centered to robot zone 608 and openings 610 and 611 may be the same width.

FIG. 6(*a*) shows the placement of two tape reels 612, 612' within tape drive 604 as described further in connection with FIG. 6(*b*). In this embodiment, the tape drive guides the magnetic tape internally by contacting only the non-magnetic side of the tape, without changing conventional LTO cartridge design regards to pin location and tape winding geometry and conventional library robot designs in terms of cartridge pick and place.

Because tape drive 604 is larger than the conventional tape drive, the two reels can be spaced farther apart, allowing for a longer tape path while maintaining a same cartridge and drive configuration and horizontal mount scheme. Tape library 600 is ideal for, for example, type 19" rack-based modular tape libraries. A horizontal dimension 617 of tape drive 604 is wider than a horizontal dimension 616 of robot zone 608 (see FIG. 6(*a*)).

In this embodiment, the tape library maintains the same cartridge and drive opening 630 configurations with reference to robot zone 608, allowing it to be used for conventional tape cartridges.

FIG. 6(*b*) shows the library with an all nonmagnetic side tape guiding tape path configuration. FIG. 6(*b*) shows the physical tape path with cartridge reel 612, drive reel 612', tape 620, four roller type guides 643, and magnetic head 622. An LTO cartridge has a specific side that is specially designed for robot handling during cartridge load and unload to and from drives. This specific side limits the orientation in which the cartridge can be loaded. In FIG. 6(*b*) for example, cartridge 606 is placed into tape drive 604 through opening 630 in a direction indicated by arrow 650 652, and its tape 620 is threaded through rollers 643 onto drive reel 612' in a manner known to persons of ordinary skill in the art.

Note that before a cartridge is loaded in tape drive 604, the tape path is clear, allowing cartridge 606 to be loaded into tape drive 604 through opening 630 and placed toward the back side of tape drive 604 to enable non-magnetic side tape guiding after the tape is threaded. In the configuration shown in FIG. 6(*b*), read/write head 622 contacts the magnetic side of the tape and plurality of rollers 643 contact the non-magnetic side of the tape.

The architecture of FIGS. 6(*a*) and 6(*b*) uses current library robot designs by handling LTO cartridge on the same designed side (with the robot handling the same cartridge pin location and the same thread unthread mechanism as conventional) and enabling the nonmagnetic tape guiding based on this unique configuration where cartridge 606 is placed deeper in the drive to engage the drive's cartridge reel motor, which in turn makes the nonmagnetic side guiding possible. By placing a standard LTO cartridge deeper in the drive, the tape path can position all guiding elements, such as rollers 643, on the nonmagnetic side with only magnetic head 622 touching the delicate magnetic coating, which is typically very thin less than 200 nm. The non-magnetic side of the tape is typically rougher due to back coating. Thus, the tape lateral motion disturbance frequency characteristics can now be controlled more efficiently, enabling higher track density applications. Also, the nonmagnetic side guiding reduces debris generated from magnetic coating, which can reduce head clogging due to excessive debris generation. As we can see in FIG. 6(*b*) compared to FIG. 1(*b*) (which is a conventional LTO tape path based on 5¼" form factor), the path length of FIG. 1(*b*) is, for example, 229 mm from reel to reel with guiding. In contrast, the non-magnetic tape path shown in FIG. 6(*b*) has a tape path length greater than 500 mm, which is a greater than 2× increase in length of the tape path. One difference between FIG. 6(*b*) and a conventional tape drive is that FIG. 6(*b*) shows that a location of the inserted cartridge 606 in the tape path enables all non-magnetic side tape guiding with an LTO cartridge using a larger side mounted drive reel 612'. A larger reel holds more tape and increases volumetric density.

In the foregoing specification, embodiments of the invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A tape-based storage device, comprising:
a cartridge having a cartridge reel with a magnetic tape;
a tape drive including (i) an opening to receive the cartridge, and (ii) an internal drive reel; and
a robot to place the cartridge in the opening of the tape drive, the robot moving in a robot zone having a robot zone width, the internal drive wheel being offset to a side from the cartridge reel, such that at least a part of the internal drive reel extends beyond the robot zone width.

2. The device of claim 1, wherein the tape drive is centered asymmetrically on the robot zone and the opening of the tape drive is offset from a center of the tape drive in a horizontal direction.

3. The device of claim 1, wherein the tape drive is part of a plurality of vertically stacked tape drives and the cartridge is taken from a plurality of vertically stacked rows of cartridges.

4. A tape-based storage device, comprising:
a cartridge having a cartridge reel with a magnetic tape;
a tape drive including (i) an opening to receive the cartridge, and (ii) an internal drive reel; and
a robot to place the cartridge in the opening of the tape drive, the robot moving in a robot zone having a robot zone width, the tape drive being wider than the robot zone width, the internal drive wheel being offset to a side from the cartridge reel, such that at least a part of the internal drive reel extends beyond the robot zone width.

5. A tape-based storage device, comprising:
a tape rack;
a tape drive with an opening to receive a cartridge, the cartridge having a cartridge reel with a magnetic tape; and
a robot to place the cartridge in the opening of the tape drive, the robot moving in a robot zone;
wherein the tape drive is wider than a width of the robot zone;
wherein the tape drive includes an internal drive reel, the internal drive reel offset to a side from the cartridge reel, such that at least a part of the internal drive reel extends beyond the width of the robot zone.

6. The device of claim 5, wherein the tape drive is centered asymmetrically on the robot zone and the opening of the tape drive is offset from a center of the tape drive in a horizontal direction.

7. The device of claim 5, wherein the tape drive is centered symmetrically on the robot zone and the opening of the tape drive is centered in the tape drive in a horizontal direction.

8. The device of claim 5, wherein a tape drive dimension is at least 215 mm wide and at least 210 mm deep.

9. The device of claim 5, wherein the cartridge is stored in a double row of cartridges and wherein the capacity of the cartridges in the double row of tape cartridges is greater than 12 TB per cartridge.

10. The device of claim 5, wherein the tape drive is part of a plurality of vertically stacked tape drives and the cartridge is taken from a plurality of vertically stacked rows of cartridges.

11. The device of claim 5, wherein the tape drive comprises four rollers that contact the magnetic tape of the cartridge on a magnetic side of the tape.

12. The device of claim 5, wherein the tape drive comprises five rollers that contact the magnetic tape of the cartridge on a magnetic side of the tape.

13. The device of claim 5, wherein the tape drive comprises six rollers that contact the magnetic tape of the cartridge on a magnetic side of the tape.

14. The device of claim 5, wherein the tape drive comprises more than two rollers contacting a magnetic side of the tape and at least one roller contacting a non-magnetic side of the tape.

15. The device of claim 5, wherein the tape drive comprises six rollers, at least one of which contacts the magnetic tape of the cartridge on a magnetic side of the tape and at least one of which contacts the magnetic tape on a non-magnetic side of the tape.

16. The device of claim 5, wherein the tape drive comprises a plurality of rollers, all of which contact the magnetic tape of the cartridge on a non-magnetic side of the tape.

17. The device of claim 5, wherein the width of the robot zone is wide enough for a single LTO cartridge and the robot has a width capable of moving in the robot zone.

18. The device of claim 5, wherein the width of the robot zone is as wide as two LTO cartridges.

19. The device of claim 5, wherein the received cartridge is taken from two rows of LTO cartridges, each row containing six LTO cartridges.

20. The device of claim 5, wherein the orientation of cartridge insertion is the same as an orientation of a cartridge in a conventional 19" frame LTO (Linear Tape Open) tape library, so cartridge handling is the same as the conventional 19" frame LTO (Linear Tape Open) tape library.

\* \* \* \* \*